G. Oerllein,
Horse Power.
No. 101,498. Patented Apr. 5, 1870.

WITNESS.
INVENTOR.
George Oerllein

United States Patent Office.

GEORGE OERLLEIN, OF UTICA, MINNESOTA.

Letters Patent No. 101,498, dated April 5, 1870.

IMPROVEMENT IN HORSE-POWERS.

The Schedule referred to in these Letters Patent and making part of the same

*To all whom it may concern:*

Be it known that I, GEORGE OERLLEIN, of the town of Utica, county of Winona and State of Minnesota, have invented a new and useful Improvement in Horse-Powers; and I do hereby declare that the following is a full, clear, and exact description thereof, which will enable those skilled in the art to make and use the same, reference being had to the accompanying drawing forming part of this specification, in which—

Figure 1:
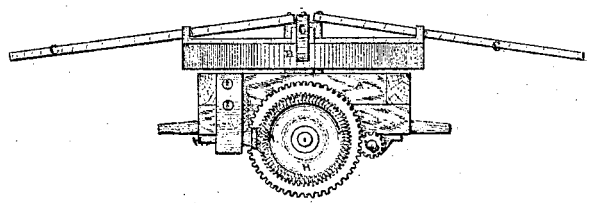
Figure 2:
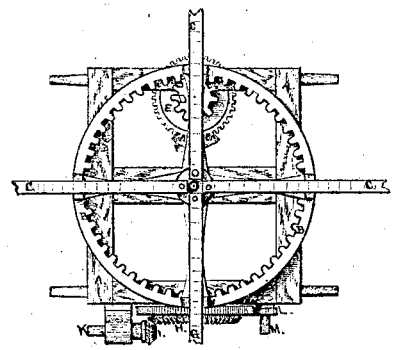

Figure 1 is an end view of my invention;

Fgure 2 a top view; and

Figure 3:
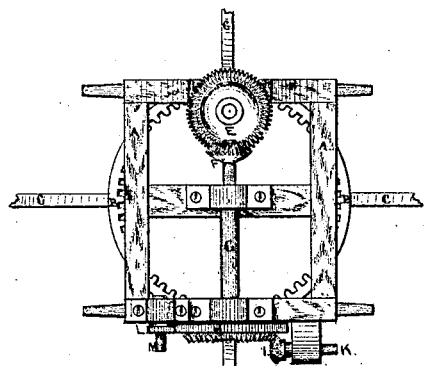

Figure 3, a bottom view, the power turned bottom side up.

Similar letters of reference in each of the figures indicate corresponding parts.

Nature and Objects of the Invention.

The object of my invention is to have the horse-power approach any place where it is to be used, and hitch on to the tumbling-rod, either from the side or from its end, without the troubling of changing about to get a suitable position, and also to pass through any narrow passage, by taking up the sweeps and swinging them round so as to come lengthways of the power.

A is the frame-work of the horse-power.

B, the master-wheel.

C, sweeps with which to operate the master-wheel. These sweeps are fastened to the center of the master-wheel by a pin, and lay in straps of iron on the outside of the wheel, and can be raised up and carried round lengthways of the power, to go through any narrow place.

D, a cog-wheel meshing into the cogs on the master-wheel.

E, wheel on the bottom or lower end of the shaft, on which is wheel D.

F, a bevel-wheel meshing into wheel E.

G, shaft, on the end of which is wheel F.

H, a wheel on the other end of shaft G. This wheel has cogs on the outside square, and bevel-cogs on the inside.

I, bevel-pinion meshing into cogs on wheel H.

K, tumbling-rod, on the end of which is pinion I.

L, a square pinion meshing into cogs on the outside of wheel H.

M, tumbling-rod, on the end of which is pinion L.

Operation.

Hitch your horses to the sweeps C when the horse-power is driven up and placed, and start the horses. This will move the master-wheel, which will turn wheels D, E, F, and H, putting the tumbling-rods in motion, and the work will be done.

I do not claim those parts of a horse-power above as new, but in a new combination, the tumbling-rods and wheels as new in use with a power.

Claims.

I claim as my invention—

1. Master-wheel B in a horse-power, when operated by movable sweeps, substantially as described.

2. The pinion I and tumbling-rod K, and wheels H, in combination with the master-wheel B and wheels D, E, and F, substantially as described.

3. Tumbling-rod M, pinion L, and wheel H, in combination with a master-wheel, B, and wheels D, E, and F, substantially as described.

GEORGE OERLLEIN.

Witnesses:
J. B. SMITH,
WILLIAM HORNOR.